3,649,692
4-AMINO ALKYL-5-METHYLENE-DIBENZO-CYCLOHEPTENES AND SALTS THEREOF

Leslie G. Humber, Dollard des Ormeaux, Quebec, Canada, assignor to Ayerst, McKenna and Harrison Limited, St. Laurent, Quebec, Canada
No Drawing. Filed May 1, 1969, Ser. No. 821,119
Int. Cl. C07c 87/28
U.S. Cl. 260—570.9                5 Claims

ABSTRACT OF THE DISCLOSURE

Nuclear substituted dibenzocycloheptane derivatives of the formula

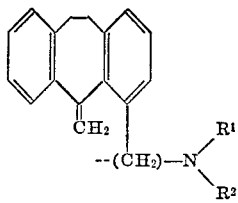

in which $R^1$ and $R^2$ are the same or different and represent hydrogen or a lower alkyl group. The compounds are prepared from 2-methyl - 1,2,3,7,8-12b - hexahydrobenzo-[1,2]cyclohept[3,4,5 - d,e] - isoquinoline by exhaustive methylation, treatment with alkali, replacement of the dimethylamino group by chlorine, and replacement of the chlorine by the appropriate basic groups. The compounds are useful as central nervous system depressant and antibacterial agents.

BACKGROUND OF THE INVENTION

The present invention relates to nuclear substituted dibenzocycloheptene derivatives, and pharmacologically acceptable salts thereof, to a process for preparing these compounds, and to intermediates used in that process. Most of the presently known dibenzocycloheptene derivatives which have useful biological activities are characterized by possessing a basic side-chain attached to position 5 of the ring system. It is a distinguishing feature of the compounds of this invention that their basic side-chain is attached to position 4 while position 5 is occupied by a methylene group. Chemical methods for the production of the compounds of the type described here have not previously been available, and it is another feature of the invention to describe such chemical processes. The compounds of this invention have central nervous system depressant activities and are also helpful as anti-bacterial agents.

SUMMARY OF THE INVENTION

The compounds of this invention may be represented by the generic Formula I:

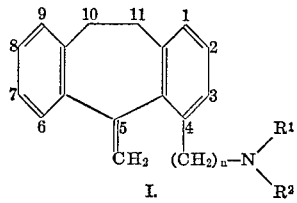

in which $R^1$ and $R^2$ are the same or different and represent hydrogen or a lower alkyl group, and $n$ represents an integer of from 1–3.

DETAILED DESCRIPTION OF THE INVENTION

More specifically, the compounds of this invention are prepared by the following process.

I prefer to use as starting material the compound 2-methyl - 1,2,3,7,8,12b - hexahydrobenzo[1,2]cyclohept-[3,4,5-d,e]-isoquinoline (II) described in J. Heterocy. Chem., vol. 3, p. 247 (1966). Said last-named compound is quaternized by treatment with methyl iodide to yield N,N-dimethyl - 1,2,3,7,8,12b - hexahydrobenzo[1,2]cyclohept[3,4,5-d,e] isoquinolinium iodide (III). Said last-named compound is treated with a source of hydroxyl ions viz, a base such as, for example, silver oxide in aqueous suspension, or an alkali metal hydroxide, or in a preferred embodiment of this invention, with the hydroxyl form of an ion exchange resin, to yield 10,11-dihydro-N,N-dimethyl-5-methylene - 5H - dibenzo[a,d] cycloheptene-4-methylamine (IV, Formula I, $R^1=R^2=CH_3$, $n=1$).

Said last-named compound is treated with ethyl chloroformate in an inert hydrocarbon-type solvent. This reaction is normally expected to replace the methyl group by the carbethoxy group. Contrary to such expectations and as an important feature of this invention, the dimethylamino group is removed in the course of this reaction and replaced by a chlorine atom to yield 10,11-dihydro-5-methylene-5H-dibenzo[a,d]cycloheptene - 4 - methylchloride (V).

When it is desired to obtain the compounds of Formula I in which $n$ represents the integer 1, $R^1$ represents hydrogen, and $R^2$ represents a lower alkyl group, said last-named compound is reacted with a lower alkylamine, for example, methylamine to yield the corresponding 4-methylamino derivative, 10,11-dihydro-N-methyl-5-methylene-5H-dibenzo[a,d]cycloheptene - 4 - methylamine (VI, Formula I, $R^1=H$, $R^2=CH_3$, $n=1$.

When it is desired to obtain compounds of Formula I in which $n$ represents the integer 2 and $R^1$ and $R^2$ are as defined in the first instance, 10,11-dihydro-5-methylene-5H-dibenzo[a,d]cycloheptene-4-methylchloride is reacted with an alkali metal cyanide, preferably potassium cyanide in aqueous dimethylformamide, to yield 10,11-dihydro-5-methylene-5H-dibenzo[a,d]cyclohepten - 4 - acetonitrile (VII).

Said last-named compound is treated under anhydrous conditions with a reducing agent which will not affect the methylene linkage such as, for example, lithium aluminium hydride, preferably in the presence of aluminium chloride, to yield 2'-[10,11-dihydro - 5 - methylene-5H-dibenzo[a,d]cyclohepten-4]-ethylamine (VIIIa, Formula I, $R^1=R^2=n=2$).

Said last-named compound may be treated with a mixture of formic acid and formaldehyde in aqueous solution to yield the corresponding di-methylated derivative N,N-dimethyl-2'-[10,11-dihydro - 5 - methylene-5H-dibenzo[a,d]-cyclohepten-4]ethylamine (VIIIb, Formula I, $R^1=R^2=CH_3$, $n=2$).

Alternatively, 10,11 - dihydro-5-methylene-5H-dibenzo-[a,d]cyclohepten-4-ethylamine is treated with a formylating agent such as, for example, formic acetic anhydride, to yield the corresponding N-formyl derivative, N-formyl-2'-[10,11 - dihydro - 5 - methylene-5H-dibenzo[a,d]cyclohepten-4]-ethylamine, (VIIIc), which in turn may be reduced, preferably by treatment with lithium aluminium hydride in a solvent such as, for example, tetrahydrofuran, to yield the corresponding monomethyl derivative N-methyl-2′ - [10,11-dihydro-5-methylene-5H-dibenzo[a,d]cyclohepten-4]-ethylamine (VIII$d$, Formula I, $R^1$=H, $$R^2=CH_3$$

$n=2$).

Alternatively, 10,11 - dihydro-5-methylene-5H-dibenzo[a,d]cyclohepten-3-acetonitrile may be treated with a strong mineral acid, preferably hydrogen chloride in ethanol under anhydrous conditions, to yield the corresponding carboxamide, 10,11-dihydro-5-methylene-5H-dibenzo[a,d]cyclohepten-4-acetamide (IX). In this reaction there is also obtained the corresponding carboxylic acid, 10,11-dihydro - 5 - methylene - 5H - dibenzo[a,d]cyclohepten-4-acetic acid (X). It will be obvious to those skilled in the art that said last-named acid is also useful as an intermediate for preparing some of the compounds named above, for example via the corresponding acid halide and subsequent reaction with ammonia or a lower alkylamine, followed by a reduction.

When it is desired to prepare the compounds of this invention of Formula I in which $n$ represents the integer 3 and $R^1$ and $R^2$ are as defined in the first instance, 10,11-dihydro - 5 - methylene - 5H - dibenzo[a,d]cycloheptene-4-methylchloride is treated with the sodium salt of diethyl malonate under anhydrous conditions, preferably in anhydrous ethanol, to yield diethyl [10,11-dihydro-5-methylene - 5H - dibenzo[a,d]cycloheptene-4]methylenemalonate (XI). Said last-named compound is easily hydrolyzed and decarboxylated by treatment with a strong base, for example aqueous potassium hydroxide, preferably at the reflux temperature of the mixture, to yield 3-[10,11-dihydro-5-methylene - 5H - dibenzo[a,d]cycloheptene-4]propionic acid (XII). Said last-named compound is converted to the corresponding acid halide, preferably the acid chloride, preferably by treatment with thionyl chloride, and then reacted with ammonia to form the corresponding carboxamide, 3′-[10,11-dihydro-5-methylene-5H-dibenzo[a,d]-cycloheptene-4]propionamide (XIII$a$). Said last-named compound may in turn be reduced, preferably by treatment with lithium aluminium hydride, to yield 3′-[10,11-dihydro - 5 - methylene-5H-dibenzo[a,d]cycloheptene-14-]-propylamine (XIV$a$, Formula I, $R^1$=$R^2$=H, $n$=3).

Alternatively, 3′-[10,11-dihydro - 5 - methylene-5H-dibenzo-[a,d]cycloheptene-4]propionic acid (XII) may be converted to the corresponding acid halide as described above and treated with a lower alkylamine such as, for example, dimethylamine or methylamine to yield N,N-dimethyl-3′-[10,11-dihydro - 5 - methylene - 5H - dibenzo-[a,d]cycloheptene-4]propionamide (XIII$b$) or N-methyl-3′-[10,11-dihydro - 5 - methylene-5H-dibenzo[a,d]cycloheptene-4]propionamide (XIII$c$), respectively.

Both said last-named compounds may be reduced, preferably by treatment with lithium aluminium hydride, to the corresponding N,N-dimethyl - 3′ - [10,11-dihydro-5-methylene-5H-dibenzo[a,d]cycloheptene - 4]propylamine (XIV$b$, Formula I, $R^1$=$R^2$=$CH_3$, $n$=3) and N-methyl-3′-[10,11-dihydro - 5 - methylene-5H-dibenzo[a,d]cycloheptene-4]propylamine, (XIV$c$) Formula I, $R^1$=H, $R^2$=$CH_3$, $n$=3), respectively. Said last-named compound may also be obtained from the corresponding N,N-dimethyl derivative by treatment with ethyl chloroformate in an anhydrous hydrocarbon-type solvent, for example benzene, to yield the N-carbethoxy - N - methyl-3′-[10,11-dihydro-5-methylene-5H-dibenzo[a,d]cycloheptene - 4]propylamine. Said last-named compound is hydrolyzed with a base, preferably potassium hydroxide in aqueous propylene glycol, to yield N-methyl-3′-[10,11-dihydro-5-methylene-5H-dibenzo[a,d]cycloheptene-4]propylamine.

All the compounds of Formula I in which $R^1$, $R^2$, and $n$ are as defined above are basic in nature and may be reacted with pharmacologically acceptable acids to form the corresponding pharmacologically acceptable salts. Such salts are pharmacologically equivalent to the corresponding free bases.

The nuclear substituted dibenzocycloheptene derivatives of this invention, especially in the form of their pharmacologically acceptable salts, have been found to possess interesting pharmacological properties. More particularly, these compounds, in standard pharmacological tests for example in a procedure similar to that described by F. Herr et al. in Arch. Int. Pharmacodyn., vol. 134, p. 328, (1961) for the testing of central nervous system depressant, especially tranquilizing agents by their ability to potentiate the narcotic effects of ethyl alcohol, have exhibited utility as central nervous system depressant, in particular transquilizing agents.

When the compounds of this invention are employed as central nervous system depressant, in particular as tranquilizing agents in warm-blooded animals, for example in rats, alone or in combination with pharmacological acceptable carriers, the proportion of such carriers, solvents or excipients is determined by the solubility and the chemical nature of the compound, by the chosen route of administration, and by standard biological practice. For example, the compounds of this invention may be administered orally in solid form containing such excipients as starch, lactose, sucrose, magnesium stearate as lubricant and other excipients known to those skilled in the art and as mentioned in standard reference books on pharmaceutical practice for example in "Remington's Practice of Pharmacy." They may also be administered orally in the form of solutions in pharmacologically acceptable solvents, or they may be injected parenterally, preferably in the form of sterile solutions containing such quantities of other solutes, for example, sodium chloride, sodium citrate or glucose, so as to make the solution isotonic.

The dosage of the compounds of this invention will vary with the form of administration and with the particular compound chosen, as well as with the particular host under treatment. Generally, treatment is initiated with small dosages substantially less than the optimum dose for the particular compound, and thereafter, the dosage is increased by small increments until the optimum effect under the circumstances has been reached. In general, the compounds in this invention are most desirably administered at a concentration level that will afford effective results without causing any harmful or deleterious side effects, preferably at a level in the range of from about 0.01 mg. to 100 mg. per kilogram body weight per day, although as aforementioned variations will occur. However, a dosage level in the range of from about 0.1 mg. to about 10 mg. per kilogram per day, preferably in divided doses, is most desirably employed in order to achieve effective results.

The following formulae and examples will illustrate this invention. All the compounds described in the examples have also been identified by elemental analysis.

The compounds of this invention are also useful as antibacterial agents. For example, when tested by a modification of the serial dilution tube technique described by Rammelkamp in Proc. Soc. Exp. Biol. Med, vol. 51, p. 95, 1942 (or by Grove and Randall in "Assay Methods of Antibiotics," Medical Encyclopedias Inc., New York 1955, the compounds of this invention are found to inhibit both gram-positive and gram-negative microorganisms such as *Staphylococcus pyogenes*, both penicillin-resistant and penicillin-sensitive strains, *Sarcina lutea*, *Streptococcus fecalis*, *Escherichia coli Aerobacter aerogenes*, *Salmonella pullorum*, *Pseudomonas aeruginosa*, *Proteus mirabilis*, and *Proteus vulgaris*.

For use as anti-bacterial agents it is preferred to dissolve or suspend the compounds of this invention in pharmaceutically acceptable vehicles at concentrations of from 0.1–5 percent, and to apply such solutions or suspensions topically to the infected areas 1 to 3 times per day as required.

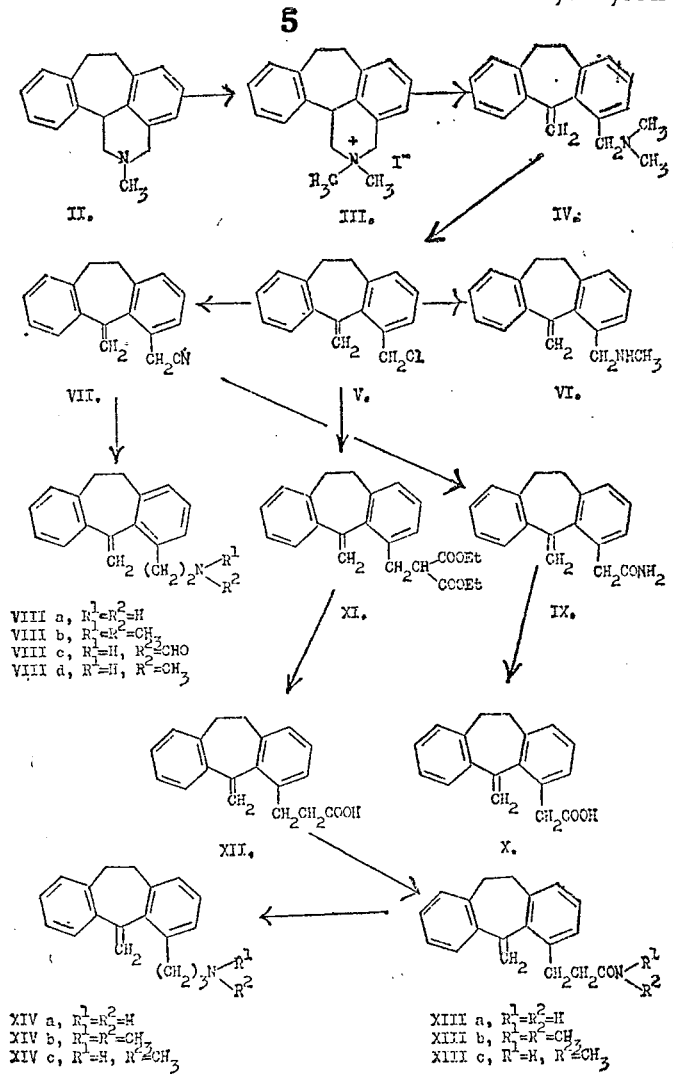

Example 1.—N,N-dimethyl-1,2,3,7,8,12b-hexahydrobenzo[1,2]cyclohept[3,4,5-d,e]isoquinolinium iodide (III)

2 - methyl - 1,2,3,7,8,12b - hexahydrobenzo[1,2]cyclohept[3,4,5-d,e]isoquinoline (10 g.) is dissolved in 50 ml. of acetone and 24.5 g. of methyl iodide (ratio 4:1) are added. After a few minutes, a colourless solid precipitates which is collected and recrystallized from acetonitrile to give the title compound solvated with one mole of acetonitrile, $\lambda_{Max.}^{CHCl_3}$ 2250 cm$^{-1}$ (C≡N), M.P. 208° C

M.P. 208° C.

Example 2.—10,11-dihydro-N,N-dimethyl-5-methylene-5H-dibenzo[a,d]cycloheptene-4-methylamine (IV)

(a) An ion exchange column is prepared from 4.0 g. of dry ion exchange resin "Dowex-2-X8" (capacity: 3.1 meg./gm.) and converted to the hydroxyl form by percolating with 60 ml. 1 N sodium hydroxide. The column is washed to neutrality with water and then with 2:1 water: methanol. N,N-dimethyl - 1,2,3,7,8,12b - hexahydrobenzo [1,2]cyclohept[3,4,5-d,e]isoquinolinium iodide (1.0 g.) obtained as described in Example 1, is dissolved in 30 ml. of methanol and then 20 ml. of water is added. This solution is passed through the column and the column is washed with 2:1 water:methanol to neutrality. The solvents are evaporated under reduced pressure. The remaining oil is dissolved in benzene and a small amount of insoluble material is removed. Removal of the benzene and crystallization of the residue from acetonitrile gives the title product with M.P. 62° C.

The hydrochloride salt is prepared with hydrogen chloride in ether, M.P. 229° C. (from acetonitrile).

(b) Dimethylamine hydrochloride (5 g.) is dissolved in 10 ml. of water and sodium hydroxide (10 N) is added to basic pH. The free amine is extracted with 50 ml. of chloroform. 10,11-dihydro - 5 - methylene - 5H - dibenzo [a,d]cycloheptene-4-methylchloride (200 mg.), obtained as described in Example 3, is dissolved in 1 ml. of chloroform and added to the extracted dimethylamine. After one-half hour a 1% solution of sodium hydroxide (20 ml.) is added and the two layers are vigorously stirred. The chloroform layer is collected, dried over anhydrous sodium sulfate and the solvent is evaporated, leaving an oil which solidifies and is recrystallized from acetonitrile, to yield the title compound identical with the product described above by M.P., U.V. and NMR.

Example 3.—10,11-dihydro-5-methylene-5H-dibenzo [a,d]cycloheptene-4-methychloride (V)

Ethyl chloroformate (3.16 g.; 0.03 mole) is dissolved in 10 ml. of benzene and added dropwise to a refluxing solution of 10,11 - dihydro-N,N-dimethyl-5-methylene-5H-dibenzo[a,d]-cycloheptene-4-methylamine, obtained as described in Example 2 (5.2 g.; 0.02 mole) in 50 ml. of benzene. Refluxing is continued for 1.5 hours and the solution is left overnight. The solvent is evaporated leaving a colourless solid which is crystallized from acetonitrile or hexane, to yield the title compound with M.P. 115° C.

Example 4.—10,11-dihydro-N-methyl-5-methylene-5H-dibenzo[a,d]cycloheptene-4-methylamine (VI)

10,11 - dihydro-5-methylene - 5H - dibenzo[a,d]cycloheptene-4-methylchloride, obtained as described in Example 3, (10 g.) and methylamine (40 ml.) are dissolved in 80 ml. of ethanol in a pressure bottle. The solution is heated in an oil bath at 65° C. for 16 hours. The solvents are evaporated leaving an oil which is dissolved in chloroform and washed with 10% aqueous hydrochloric acid. The hydrochloride salt so formed is more soluble in chloroform than in water. Evaporation of the chloroform gives an oil which solidifies when acetone is added, to yield the hydrochloric acid salt of the title compound with M.P. 170° C. after crystallization from acetonitrile. The free base, obtained by treatment of the hydrochloride with alkali and extraction with chloroform followed by evaporation of the solvent, is an oil, NMF 136 Hz.

Example 5.—10,11-dihydro-5-methylene-5H-dibenzo [a,d]cyclohepten-4-acetonitrile (VII)

Potassium cyanide (1.0 g.) is dissolved in 20 ml. of dimethylformamide by heating on a steam bath and by adding water (2.0 ml.) 10,11-dihydro-5-methylene-5H-dibenzo[a,d]cycloheptene-4-methylchloride (1.0 g.), obtained as described in Example 3, is added and heating is continued for 3 hours. The solution is poured into 100 ml. of water and the product extracted with chloroform. The organic layer is washed twice with water, dried over anhydrous sodium sulfate and the solvent is evaporated under reduced pressure leaving an oil which is passed through neutral alumina (activity II) and eluted with benzene. Evaporation of the solvent and recrystallization from hexane yields the title compound with M.P. 110° C.

Example 6.—10,11-dihydro-5-methylene-5H-dibenzo [a,d]cyclohepten-4-acetamide (IX)

10,11-dihydro - 5 - methylene - 5H - dibenzo[a,d]-cyclohepten-4-acetonitrile, obtained as described in Example 5, (12 g.) is dissolved in 250 ml. of ethanol (anhydrous) and cooled to 0° C. Hydrogen chloride gas is bubbled in for 2 hours, not allowing the temperature to rise above 0° C. The solution is stored at 0° C. for 16 hours and then refluxed for two hours. The solvent is evaporated, 250 ml. of water are added, and then 2 N sodium hydroxide is added until the solution is basic. Refluxing for one hour yields a colourless solid after cooling which is collected by filtration and recrystallized from methanol to give the title product with M.P. 214° C.

The aqueous basic filtrate from above is washed with chloroform and made acidic. The precipitate is extracted with chloroform, the solvent dried and evaporated leaving a solid which is recrystallized from iso-octane and identified as 10,11-dihydro-5-methylene-5H-dibenzo[a,d]cyclohepten-4-acetic acid (X) with M.P. 167° C.

Example 7.—2'-[10,11-dihydro-5-methylene-5H-dibenzo [a,d]cyclohepten-4]ethylamine (VIIIa)

10,11 - dihydro - 5 - methylene-5H-dibenzo[a,d]cyclohepten-4-acetonitrile, obtained as described in Example 5, (20 g.) in 510 ml. of anhydrous ether is added to a mixture of 12.3 g. of aluminum chloride and 3.48 of lithium aluminum hydride in 220 ml. of ether. The solution is stirred with a mechanical stirrer and refluxed for three hours. After cooling, 32 ml. of water are added cautiously, followed by an additional 2 liters. The solution is made basic with 4 N sodium hydroxide. The ethereal solution contains all the amine and evaporation of the solvent gives the title compound as an oil which is distilled at B.P. 142–146° C. (0.1 mm. Hg).

The maleate salt is prepared by dissolving 4 g. of the free base and 1.86 g. of maleic acid in 50 ml. of acetone and refluxing for one half hour. After cooling, 50 ml. of ether is added and the precipitate is recrystallized from 2-propanol, to yield the 2'-[10,11-dihydro-5-methylene-5H-dibenzo[a,d]cyclohepten-4]ethylamine maleate with M.P. 180° C.

Example 8.—N-formyl - 2' - [10,11-dihydro-5-methylene-5H-dibenzo[a,d]cyclohepten-4]-ethylamine (VIII c)

Acetic anhydride (12.1 g.) and 5.1 ml. of formic acid are heated for two hours at 58° C. 2'-[10,11-dihydro-5-methylene-5H-dibenzo[a,d]cyclohepten-4]ethylamine, obtained as described in Example 7, (7 g.) is cooled to 0° C. and the cooled formic acetic anhydride obtained as above is added slowly with continuous cooling and stirring. Stirring is continued for 16 hours and then the solution is poured onto ice and extracted with chloroform. The chloroform solution is washed with sodium bicarbonate solution and water, dried and evaporated to yield the title compound as an oil, B.P. 210° C. (0.1 mm. Hg).

Example 9.—N-methyl-2'-[10,11-dihydro - 5 - methylene-5H-dibenzo[a,d]cyclohepten-4]-ethylamine (VIII d)

N-formyl - 2' - [10,11-dihydro-5-methylene-5H-dibenzo [a,d]cyclohepten-4-]-ethylamine, obtained as described in Example 8 (6 g.) is dissolved in 300 ml. of tetrahydrofuran and 1.2 g. lithium aluminum hydride is added. The mixture is stirred and refluxed for 5 hours. After cooling and destroying the excess reagent the solvent is evaporated and the residue dissolved in benzene. The solution is dried and evaporated to dryness yielding the title compound as an oil, NMR 142 Hz., which is purified by recrystallization of the maleate salt, prepared in acetone with 2.18 g. of maleic acid in the same manner as described in Example 7, to M.P. 146° C.

Example 10.—N,N-dimethyl-2'-[10,11-dihydro-5-methylene-5H-dibenzo[a,d]cyclohepten-4]-ethylamine (VIIIb)

2'-[10,11-dihydro-5-methylene - 5H - dibenzo[a,d]cyclohepten-4]ethylamine, obtained as described in Example 7, (5 g.) is dissolved in 5 ml. of formic acid, diluted with 5 ml. of water and 5 ml. of formaldehyde (35% sol.) and heated overnight on a steam bath. Water (100 ml.) is added and the solution is made basic with 28% aqueous ammonium hydroxide. The amine is extracted with 250 ml. of methylene dichloride. The solvent is dried and evaporated to yield the title compound as an oil, NMR 136 Hz. The maleate salt is prepared by dissolving the oil (5 g.) in 5 ml. of acetone. 2.1 g. (1 eq.) of maleic acid dissolved in 35 ml. of acetone is added and the solutions are combined and refluxed for 45 minutes. The solvent is evaporated to 10 ml. The maleate salt crystallizes and is recrystallized from 2-propanol, to yield N,N-dimethyl - 2' - [10,11-dihydro - 5 - methylene-5H-dibenzo[a,d]cyclohepten - 4] - ethylamine maleate with M.P. 156° C.

Example 11.—Diethyl[10,11-dihydro - 5 - methylene-5H-dibenzo[a,d]cycloheptene-4]-methylenemalonate (XI)

Sodium metal (0.23 g.) is dissolved in 20 ml. of dry ethanol. Diethyl malonate (1.6 g., 1.52 ml., 0.01 mole) is added and the solution is stirred and refluxed for 20 minutes. 10,11-dihydro-5-methylene - 5H dibenzo[a,d]cycloheptene-4-methylchloride, obtained as described in Example 3, (2.55 g., 0.01 mole) is added while stirring and refluxing is continued for two hours until the mixture is neutral. After cooling the solvent is evaporated and the residual oil taken up in methylene dichloride, washed with water and dried. The solvent is evaporated to yield the title compound as an oil, B.P. 180° C. (0.01 mm. Hg).

Example 12.—3-[10,11 - dihydro-5-methylene-5H-dibenzo [a,d]cycloheptene-4]-propionic acid (XII)

Diethyl[10,11 - dihydro - 5 - methylene - 5H - dibenzo [a,d]cycloheptene-4]-methylenemalonate, obtained as described in Example 11, (3.78 g.; 0.01 mole) is dissolved in 20 ml. of ethanol (95%) and 1.3 g. of 85% solid potassium hydroxide is added. The mixture is refluxed for two hours and the solvent is evaporated. The residue is dissolved in 500 ml. of water, washed with ether and made acidic. The product is extracted with methylene dichloride (200 ml.) and the solution is dried. After evaporating the solvent, the residue is heated to 150° C. under reduced pressure (0.01 mm. Hg) for 1.5 hours. After cooling, the oil solidifies and is crystallized from benzene, to yield the title compound with M.P. 178° C.

Example 13.—3'-[10,11-dihydro - 5 - methylene - 5H - dibenzo[a,d]cycloheptene-4]propionamide (XIIIa)

3'-[10,11-dihydro - 5 - methylene - 5H - dibenzo[a,d]cycloheptene-4]propionic acid, obtained as described in Example 12, (20 g.) is stirred in 150 ml. of refluxing thionyl chloride containing a few drops of dimethylformamide. After two hours of refluxing all the acid is in solution. The solvent is evaporated under reduced pressure and the resulting oily acid chloride is used without further purification. 5 g. of the acid chloride are dissolved in 100 ml. of benzene and added dropwise to 150 ml. of 9% aqueous ammonium hydroxide with vigorous stirring. A solid is formed which is collected with suction and dried. The benzene solution is separated, dried and evaporated to dryness. The combined solids are crystallized several times from acetonitrile, to yield the title compound with M.P. 158° C.

Example 14.—N,N-dimethyl-3'-[10,11-dihydro-5-methylene - 5H - dibenzo[a,d]cycloheptene-4]-propionamide (XIIIb)

Dimethylamine hydrochloride (16 g.) is dissolved in 150 ml. of water in a three-neck round bottom flask and covered with 100 ml. benzene. 3'-[10,11-dihydro-5-methylene - 5H - dibenzo[a,d]cycloheptene-4]-propionylchloride (15 g.), prepared from the corresponding acid with thionyl chloride and dimethylformamide is dissolved in 100 ml. of benzene and added dropwise to the amine solution. Simultaneously, 500 ml. of 0.5 N sodium hydroxide solution is added dropwise to generate the free base. The product is collected by separating the organic layer, in which it is soluble, drying and evaporating the solvent. The oily residue is filtered through 100 gm. of silica gel, with ethyl acetate and recrystallized from isooctane-ethyl acetate, to yield the title compound with M.P. 111–113° C.

Example 15.—N,N-dimethyl-3'-[10,11-dihydro - 5 - methylene - 5H - dibenzo[a,d]cycloheptene-4]-propylamine (XIVb)

N,N - dimethyl - 3 - [10,11 - dihydro - 5 - methylene-5H-dibenzo[a,d]cycloheptene-4] - propionamide, obtained as described in Example 14, (1 g.) is dissolved in 50 ml. of tetrahydrofuran and refluxed for 3 hours in the presence of 1 g. of lithium aluminum hydride. After destroying the excess reagent and filtering, the solvent is evaporated and the residual oil dissolved in benzene. The solution is dried over anhydrous sodium sulfate and the solvent is evaporated to yield the title compound as an oil, NMR 145 Hz. The oil is dissolved in ether and ethereal hydrogen chloride is added. The salt is filtered off and recrystallized from 2-propanol-ether, to yield N,N-dimethyl - 3' - [10,11 - dihydro - 5 - methylene-5H-dibenzo[a,d]cycloheptene - 4] - propylamine hydrochloride with M.P. 124° C.

Example 16.—N - methyl - 3' - [10,11 - dihydro-5-methylene - 5H - dibenzo[a,d]cycloheptene - 4] - propylamine (XIVc)

N,N-dimethyl-3'-[10,11 - dihydro - 5 - methylene-5H-dibenzo[a,d]cycloheptene-4]-propylamine, obtained as described in Example 15, (4.5 g.) in 10 ml. of benzene is added dropwise to a refluxing solution of 0.6 g. of ethyl chloroformate in 35 ml. of benzene. Refluxing is continued for two hours, the solvent is evaporated under reduced pressure and the residual oil taken up in hot carbon tetrachloride. After cooling and discarding a small amount of a solid the solution is washed with 3% aqueous hydrochloric acid and then evaporated to dryness, to yield N-carbethoxy-N-methyl-3'-[10,11-dihydro-5-methylene - 5H - dibenzo[a,d]cycloheptene - 4] - propylamine as an oil, $$\lambda_{Max.}^{CHCl_3}\ 1680\ cm.^{-1}$$

The N-carbethoxy derivateive is dissolved in 14 ml. of propylene glycol and 0.9 g. of solid 85% potassium hydroxide is added. The solution is refluxed for 16 hours. After cooling, 50 ml. of water is added and the amine extracted with benzene. The organic solution is washed with 5% aqueous hydrochloric acid solution. The acidic phase is made basic and extracted with chloroform. The chloroform solution yields the title compound as an oil, NMR 138 Hz., which is converted to its hydrochloride salt in ether and is recrystallized from acetonitrile, to yield N - methyl - 3' - [10,11-dihydro - 5 - methylene-5H-dibenzo[a,d]cycloheptene - 4] - propylamine hydrochloride with M.P. 158° C.

I claim:

1. A compound selected from bases of the formula

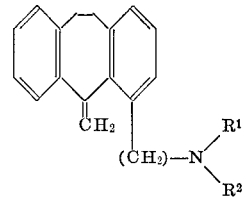

wherein $R^1$ and $R^2$ may be the same or different substituents and are each selected from the group which consists of hydrogen and lower alkyl; and acid addition salts of said bases with pharmacologically acceptable acids.

2. 10,11-dihydro-N,N-dimethyl-5-methylene - 5H - dibenzo[a,d]cycloheptene - 4 - methylamine, as claimed in claim 1.

3. The hydrochloride salt of 10,11 - dihydro-N,N-dimethyl - 5 - methylene - 5H - dibenzo[a,d]cycloheptene-4-methylamine, as claimed in claim 1.

4. 10,11 - dihydro - N - methyl - 5 - methylene-5H-dibenzo[a,d]cycloheptene - 4 - methylamine, as claimed in claim 1.

5. The hydrochloride salt of 10,11-dihydro-N-methyl-5-methylene-5H-dibenzo[a,d]cycloheptene - 4 - methylamine, as claimed in claim 1.

References Cited

Schoff: "Experientia," vol. 5, pp. 201–202 (1949).

ROBERT V. HINES, Primary Examiner

U.S. Cl. X.R.

260—286 Q, 465 K, 471 R, 475 FR, 501.1, 515 R, 544 W, 558 R, 562 P, 570.8 TC, 649 R; 424—330